(No Model.)
C. COLBY & E. BRAMMALL.
MILK COOLER.
No. 256,976.  Patented Apr. 25, 1882.
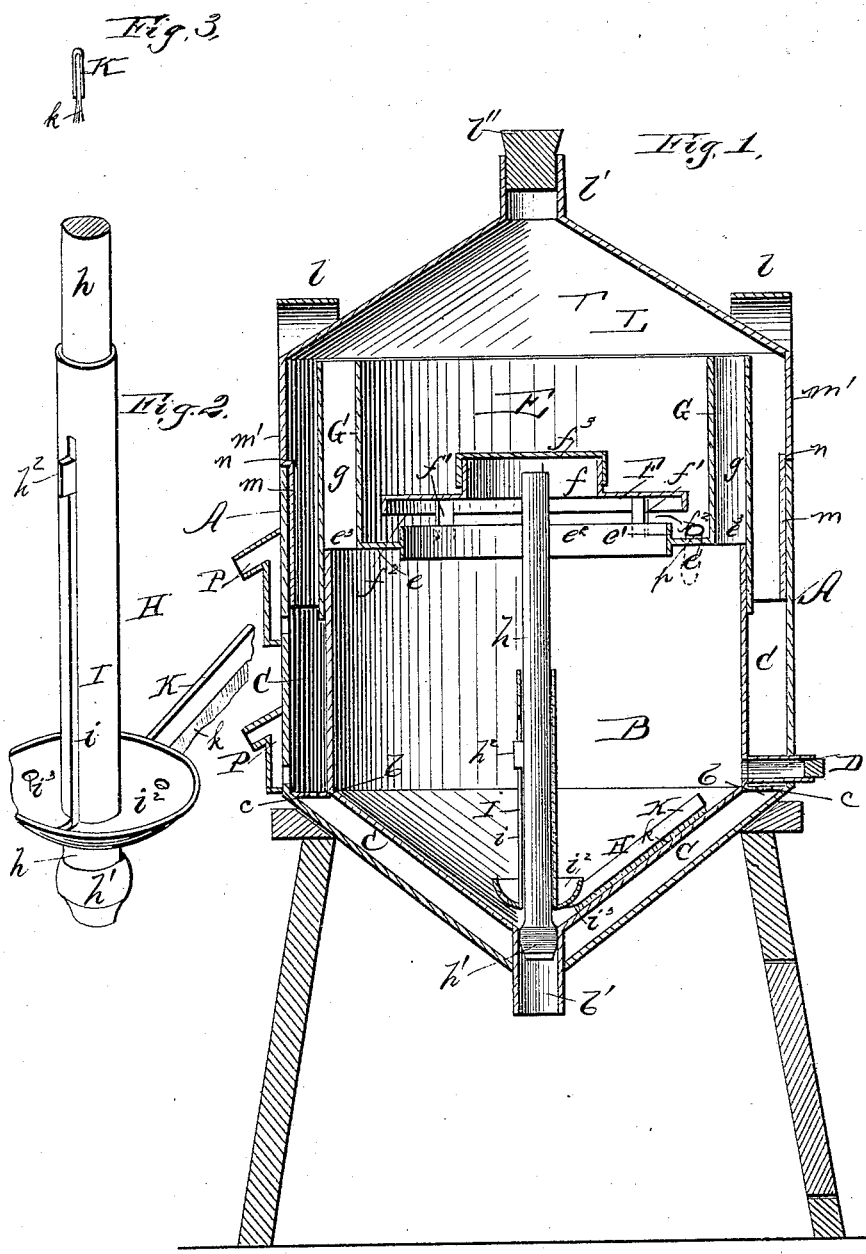

UNITED STATES PATENT OFFICE.

CHARLES COLBY AND EDWARD BRAMMALL, OF BENTON HARBOR, MICH.

MILK-COOLER.

SPECIFICATION forming part of Letters Patent No. 256,976, dated April 25, 1882.

Application filed September 27, 1881. (No model.)

*To all whom it may concern:*

Be it known that we, CHARLES COLBY and EDWARD BRAMMALL, both of Benton Harbor, in the county of Berrien and State of Michigan, have invented certain new and useful Improvements in Milk-Coolers; and we do hereby declare that the following is a full, clear, and exact description thereof, reference being had to the accompanying drawings, and to the letters of reference marked thereon, which form part of this specification.

This invention relates to that class of creamers, or apparatus for raising cream from milk, in which the milk can or receptacle is surrounded by a water-space, which is designed to be filled with cold water for the purpose of facilitating the raising of the cream.

The improvement relates to an improved cooling-pan adapted to be placed over the milk-reservoir and employed to admit of the circulation of cool or cold air over the body of milk in the reservoir.

It also relates to a wiper for cleaning the bottom of the milk-reservoir; and it further relates to the construction and arrangement of parts, as hereinafter described, and illustrated in the drawings, in which—

Figure 1 is a vertical central section of the apparatus. Fig. 2 is a perspective view of the wiper. Fig. 3 is a cross-section of wiper.

The letter A indicates an open-top cylindrical vessel that is provided with suitable handles, and constructed with a funnel-shaped bottom.

B refers to the milk-reservoir, which corresponds in shape to the vessel A, within which it is secured by an annular flange, $b$, and the milk and cream discharge tube $b'$, that leads from the bottom of the milk-reservoir through the bottom of the outer vessel. The milk-reservoir is made sufficiently small to leave a water-space, C, between it and the outer vessel, and the annular flange $b$ is formed with perforations $c$, for the passage of water to the water-space below said flange. A tube, D, leads from the milk-reservoir out through the jacket or outer vessel, A, and is provided with a plug or cock, so that milk can be drawn off through the same when desired.

E indicates the cooling-pan, which consists of a cylindrical sheet metal or tin body adapted to fit down upon the milk-reservoir to about the extent shown in Fig. 1, the depression of said pan upon the reservoir being limited by an annular horizontal flange, $e$, on the inner side of the pan. An upturned flange, $e'$, is arranged along the inner edge of the flange $e$, and above the central opening, $e^2$, which is bounded by the upturned flange, is a disk, F, formed with a central opening, $f$, somewhat smaller than the opening $e^2$. This disk is supported by short arms $f'$, secured to the flange $e$ of the pan, so as to leave an annular cold-air passage, $f^2$, for the downward passage of air from the upper part of the pan.

The disk F is provided with a flange around its central opening, and a cap, $f^3$, is employed for closing the opening when required. Openings $e^3$ are formed through the flange $e$ at its outer edge which joins the pan, and vertical convexed plates G are secured to the pan in position to form passages for conveying warm air from the milk-reservoir up through the openings $e^3$ in the flange and the vertical passages $g$, formed between the plates G and the pan-body.

H indicates the wiper or cleaner and plug. This device consists of a rod or closed cylinder, $h$, having at one end an elastic plug or stopper, $h'$, and at a point intermediate of its ends a short stud or feather, $h^2$. A tube, I, open at both ends and formed with a slot, $i$, for a portion of its length, fits and slides upon the rod, and is provided at a point near its lower end with a funnel or dish, $i^2$, made with two or more perforations, $i^3$. A plate, K, bent to form clamping-jaws, is secured to the under side of this dish, and extends out therefrom tangentially to the tube that passes through the dish. A wiper-cloth, $k$, consisting of any suitable fabric or suitable material, is held between the jaws of the arm formed by said bent plate, and is employed for cleaning the bottom of the milk-reservoir when it is rotated by turning the rod $h$, the wiper-arm being arranged at an angle corresponding to the angle of the reservoir-bottom.

L indicates the cover, having handles $l$ and a central opening, $l'$, which can be closed with a stopper, $l''$. This cover has a part, $m$, of its cylindrical portion made somewhat smaller than the upper part, $m'$, thereof, with an annular flange, n, between the two. The cover is fitted into the vessel A up to this flange n, so that the vertical part or flange m of the cover will enter the water, and thus provide a seal for protecting the milk from outside air when it is not desired to admit the same.

The outer vessel is provided with drip-pipes P, and the pan has a drip-pipe, p, which can be used when ice is placed in the pan, the vertical flange of the pan in such case preventing the water from flowing into the milk-reservoir. The milk-reservoir is filled with milk, the cover fitted on the outer vessel, and the cap or stopper of the cover removed. The water previously filled into the water space will cool the sides and bottom of the milk-reservoir, and the cool air, descending through the annular air-passage of the cooling-pan, will rapidly cool the surface of the milk, so that the entire body of milk will be quickly cooled. The animal heat and odors from the milk will pass up with the warm air through the passages g, and thence out through the top of the can-cover. When the milk has cooled the cover-stopper can be replaced.

In drawing off the milk the center cap of the cooling-pan will be removed, so as to give access to the rod having the stopper, which latter device has heretofore closed the opening in the bottom of the milk-reservoir. The rod will be raised and rotated, and the disk, which is secured to the tube on the rod, will hence be rotated so as to carry the wiper over the bottom of the milk-reservoir, thereby wiping off all sediment and directing the same to the hole through which the milk is passing out.

It will be seen that by reason of the wiper striking the bottom of the can it, with the dish and tube, will be slightly raised when the stopper or plug of the rod is inserted in the opening at the bottom of the milk-reservoir, and that when the rod is raised the tube and dish will drop down, thereby maintaining the wiper in contact with the reservoir-bottom.

It will also be observed that the wiper-arm prevents rotary currents while the milk is being drawn off.

After drawing off the milk the opening can be closed, a cream-jar then placed under the same, and the rod and plug again raised.

The outer vessel will be seated upon any suitable frame, and can be removed therefrom when desired.

Having thus described our invention, what we claim is—

1. In an apparatus for raising cream, the cooling-pan adapted to fit upon the milk-reservoir and provided with an annular air-passage for the descent of cold air into the milk-reservoir, and also provided with vertical side passages for the ascent of the warm air, substantially as shown and described.

2. In an apparatus for raising cream, the cooling-pan E, provided with the flange $e'$ around a central opening in its bottom, the elevated disk F, with annular cold-air passage $f^2$, and the vertical side passages, g, for warm air, substantially as described.

3. In an apparatus for raising cream, the wiper, consisting of a rod, h, with the slotted tube arranged to slide longitudinally thereon, the funnel-shaped dish fitted upon the tube, and the arm extending out from the dish and carrying material suitable for wiping the bottom of the milk-reservoir when the wiper is turned about its axis, substantially as described.

4. The combination, in an apparatus for raising cream, of the milk-reservoir having a funnel-shaped bottom, with the wiper H and the cooling-pan E, having an opening through which access can be had to the wiper, and a cap for closing the said opening, substantially as described.

5. The combination, in an apparatus for raising cream, of the milk-reservoir with the wiper consisting of the rod h, the tube I, arranged to slide upon said rod and carrying a dish, and the arm extending out from said dish and adapted to hold the wiper-cloth, substantially as described.

In testimony that we claim the foregoing as our own we affix our signatures in presence of two witnesses.

CHARLES COLBY.
EDWARD BRAMMALL.

Witnesses:
A. PLUMMER,
CUSHAN BUSS.